Figure 1:
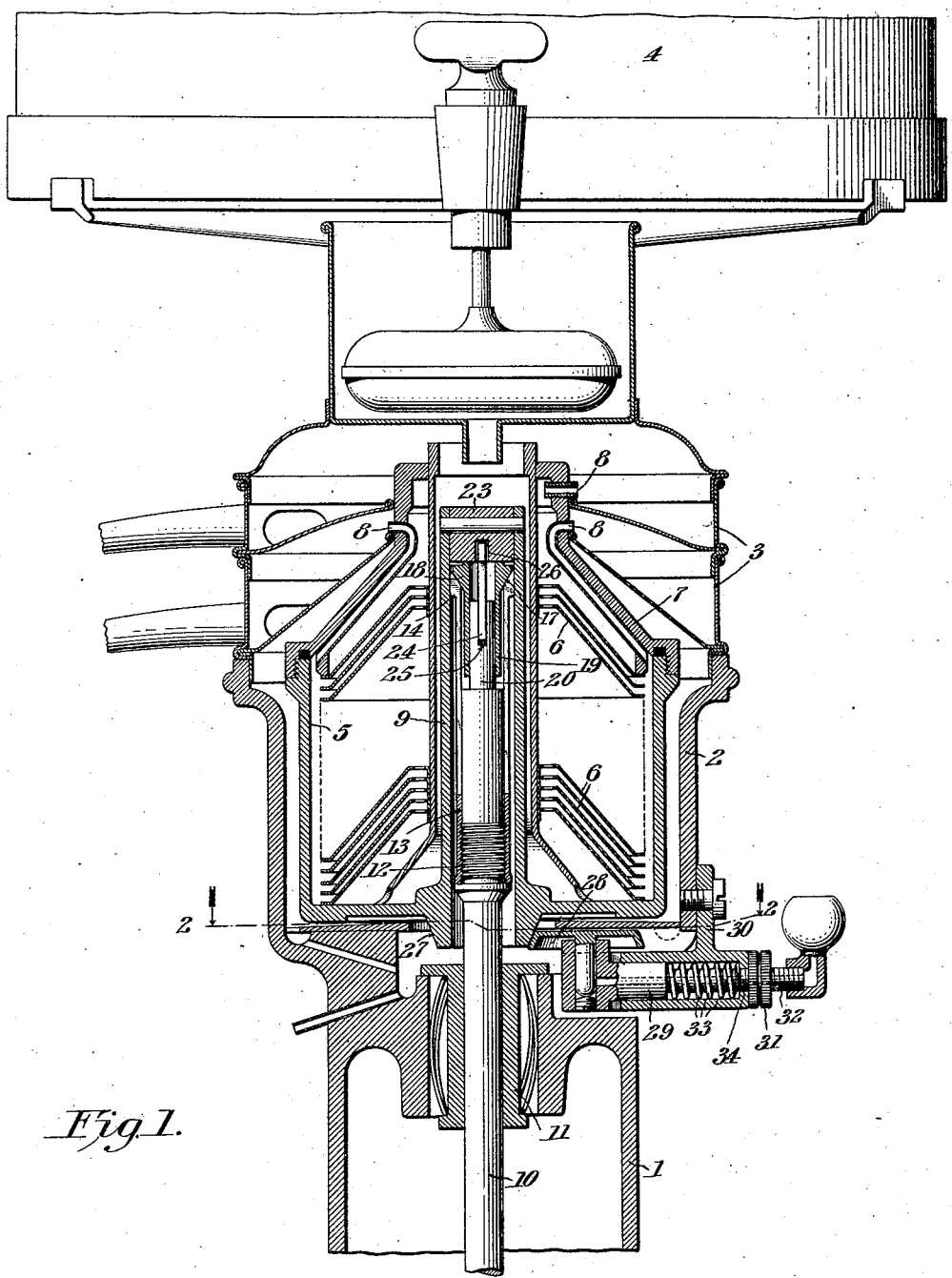

E. G. PEARSON.
CENTRIFUGAL SEPARATOR.
APPLICATION FILED APR. 26, 1921.
1,417,558.
Patented May 30, 1922.
2 SHEETS—SHEET 2.
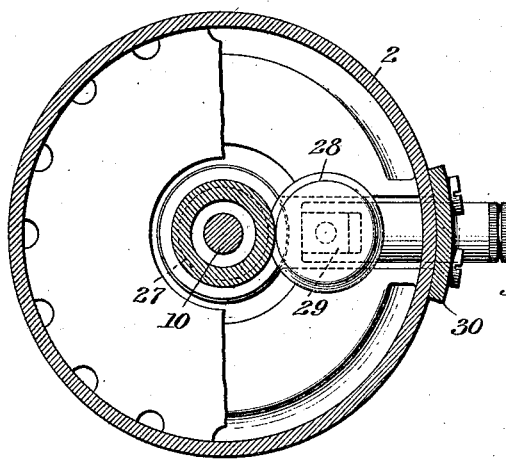
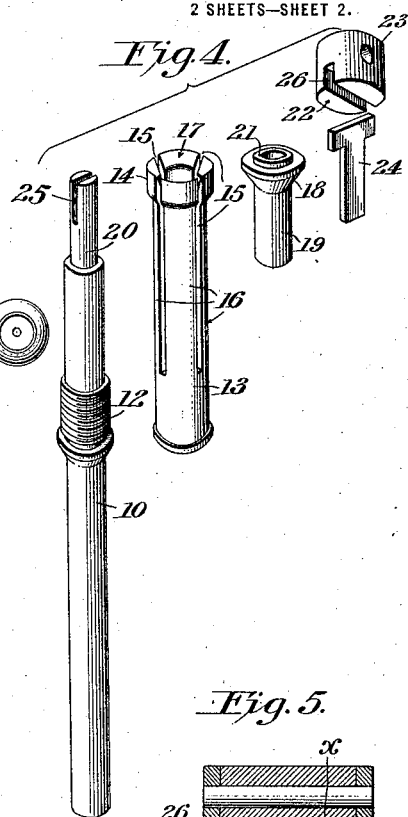
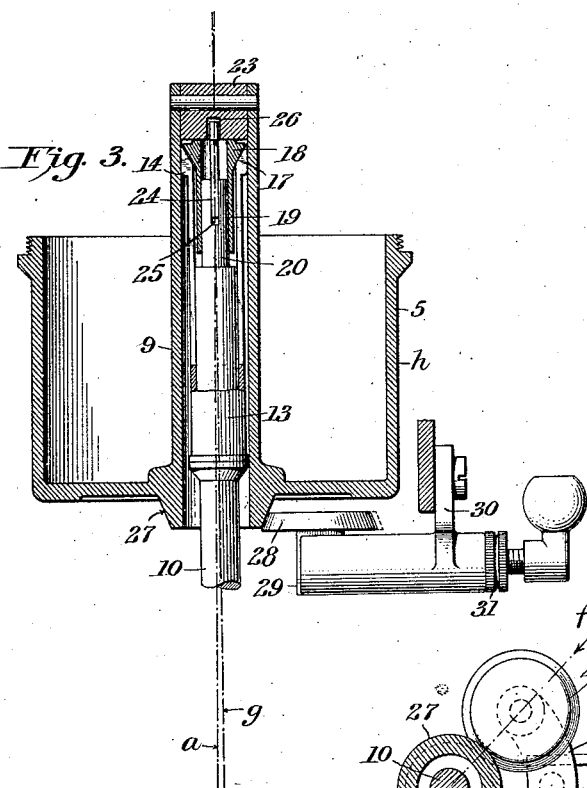
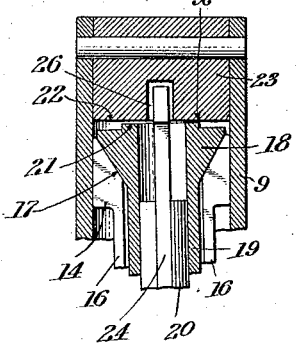
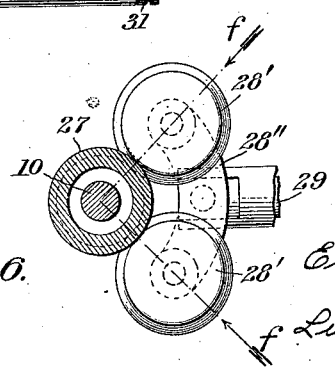
INVENTOR
Eric G. Pearson
BY
Leonard E. Fischer
his ATTORNEY

UNITED STATES PATENT OFFICE.

ERIC G. PEARSON, OF ELIZABETH, NEW JERSEY.

CENTRIFUGAL SEPARATOR.

1,417,558.   Specification of Letters Patent.   Patented May 30, 1922.

Application filed April 26, 1921. Serial No. 464,720.

*To all whom it may concern:*

Be it known that I, ERIC G. PEARSON, a citizen of the United States, residing at Elizabeth, in the county of Union and State of New Jersey, have invented certain new and useful Improvements in Centrifugal Separators, of which the following is a specification, reference being had therein to the accompanying drawings.

This invention relates to improvements in separators of that type wherein there is provided a separating bowl adapted to be rotated at a high rate of speed from a suitable driving spindle, whereby particles of liquid within the bowl are separated one from another by means of centrifugal force. Heretofore difficulty has been experienced in this type of separators by the bowl being out of balance and, due to the high rate of speed at which they are necessarily operated, any unevenness in balancing produces vibration of the bowl and its operating spindle, thus causing them to chatter and produce disagreeable noise and excessive wear in the bearings.

Certain constructions have heretofore been designed wherein an unevenly balanced bowl will turn comparatively smoothly when rotating at high speed but these are defective when rotating at low speeds, as when starting the stopping.

This invention has for an object to overcome the inherent defects in this type of separators by constructing the bowl and its supporting spindle so that the bowl may be rotated smoothly about its geometrical axis regardless of the location of its center of gravity.

It will be understood that when an unevenly balanced bowl is loosely suspended from a point located above its center of gravity, it will assume a position wherein its geometrical axis is located at an angle to a vertical line passing through the center of gravity of the bowl which line is commonly termed the "line of direction of gravity" but which for convenience will hereafter be called the "gravitational line", and when the bowl is rotated from said point of suspension the geometrical axis will describe a circular path about the gravitational line of the bowl.

It is a further object of this invention to so support the bowl as to permit its gravitational line to substantially coincide with the axis of the spindle and then prevent its geometrical axis from moving about the gravitational line.

These and other objects of the invention are attained in the present construction, which comprises a frame supporting a driving spindle rotated from any suitable mechanism and from the upper end of which spindle depends the separator bowl, keyed to turn therewith but free to swing relatively thereto.

A manually adjustable roller, adapted to act upon the bowl, affords means for maintaining it in a position with its geometrical axis inclined to its gravitational line and for preventing said geometrical axis from moving about said gravitational line.

The invention is illustrated in its preferred form in the accompanying drawings, in which Fig. 1 is a vertical sectional view of a centrifugal separator embodying the present invention. Fig. 2 is a horizontal sectional view taken on the line 2—2 of Fig. 1. Fig. 3 is a detail sectional view showing the bowl suspended from its supporting spindle with its geometrical axis at an angle to its gravitational line, together with the means for maintaining it in such position. Fig. 4 illustrates detail perspective views of the actuating spindle and several associated parts later to be described. Fig. 5 is an enlarged detail sectional view of the upper end of the actuating spindle and the parts associated therewith showing more clearly the manner in which the bowl is supported, and Fig. 6 is a modification showing two spaced rollers for holding the bowl in a position with its geometrical axis inclined to its gravitational line.

Referring more particularly to the drawings, the invention is illustrated in its preferred form in a separator constructed with a frame 1, supporting a casing 2, pans 3 and a supply tank 4. A separating bowl 5 is located within the casing 2 and may be provided with the usual separating disks 6, cover 7 and outlets 8. The bowl 5 is formed with a central tube 9 which is indirectly supported by the upper end of a supporting and actuating spindle 10 which is rotated by suitable mechanism (not shown) as is common to separators of this type. A spring bearing 11 carried by the frame 1 affords yielding means for supporting the spindle in upright position. About the upper end of the spindle 10 and secured thereto by threads 12 is a thin sleeve 13 provided with a head 14 which is slightly smaller than the inside diameter of the tube 9 within which it is adapted to fit. This sleeve 13 is provided with cuts 15 dividing it into four yielding sections or arms 16. This sleeve may be formed as an integral part of the spindle but is preferably formed as a separate piece for convenience of manufacture.

The head 14 is internally provided with a substantially conical seat 17 upon which is adapted to rest the cone-shaped head 18 of a sleeve 19 fitted about the reduced upper end 20 of the spindle 10. The head 18 is provided with a substantially flat upper surface 21 and upon this surface rests the under side 22 of a cylindrical block 23 secured in the upper end of the tube 9. The block 23 is in effect a part of the tube 9 but is used as a separate piece merely for convenience in manufacture. Thus it will be observed that the weight of the bowl 5 rests upon the cone-shaped head 18 which in turn is seated in the head 14, thereby causing the yielding arms 16 to expand to grip the inner walls of the tube 9 and locate the upper end of the tube substantially concentric with the spindle 10. The spring arms 16 also permit of a limited lateral movement of the tube 9 with respect to the spindle 10. The bowl 5 is positively rotated by the spindle 10 through the medium of a key 24 of which one end is fitted within a slot 25 in the upper end of the spindle 10 and the other end is loosely fitted in a slot 26 in the block 23.

From the foregoing description it will be seen that the bowl is suspended from and rotated by the upper end of the spindle and is free to swing relatively thereto.

Upon the under side of the bowl there is provided a conical hub 27 concentric with the geometrical axis of the bowl. The outer periphery of this hub is engaged by a roller 28 carried by an adjustable block 29 slidingly mounted in a bracket 30 secured to the frame 1. An adjusting nut 31 threaded upon the extension 32 of the block 29 and a coil spring 33 interposed between the block 29 and the wall 34 of the bracket 30 afford means for adjusting the roller relatively to the spindle 10.

Referring now to Fig. 3 in which it is supposed that the side $h$ of the bowl is the heavier, the gravitational line is represented by the dot-dash line $g$ and the geometrical axis of the bowl is represented by the dot-dash line $a$, it will be understood that a one-half rotation of the bowl would, without the present invention, reverse the conditions and place the geometrical axis $a$ of the bowl a corresponding distance to the right of the line $g$.

With the present invention, should the bowl be unevenly balanced as above described, the roller 28 is adjusted to bear against the hub 27 at one side of the gravitational line and holds the geometrical axis of the bowl at the opposite side of the gravitational line or in a position substantially as shown in Fig. 3. The spring 33, being of a strength sufficient to overcome the unevenness in the weight of the bowl, the bowl is held in the above described position and turns smoothly about its geometrical axis $a$.

Referring now to Fig. 5, it will be observed that when the bowl assumes the position relative to the spindle as shown in Fig. 3, the surfaces 21 and 22 are partially angularly separated and the weight of the bowl rests at a point at one side of the geometrical axis of the bowl or substantially at $x$, and as this point is on the same side of the gravitational line as the roller 28 the bowl normally exerts a sidewise pressure toward the roller and as this pressure is resisted by the spring 33 the bowl is maintained in a permanent position where it rotates smoothly at either high or low speeds.

The spring 33 is used to yieldingly hold the roller 28 against the hub 29 only as a safe-guard against excessive and abnormal strains which otherwise might injure parts of the mechanism.

In the modification shown in Fig. 6 there are employed two rollers 28' instead of the single roller 28 shown in the preferred form. These rollers are carried by a cross head 28'' loosely journaled in the block 29 and afford a two point contact with the hub 27. It will be understood that the pressure exerted upon the hub 27 will be in the direction of the converging arrows $f$ which, under certain conditions, will more effectively maintain the axis of the bowl in the desired fixed position.

It is to be understood that this invention is not limited to the exact construction shown and described, it being recognized that changes may be made in the construction by using various equivalents without departing from the spirit or scope of the invention.

Having thus set forth the nature of the invention, what I claim herein is—

1. In a separator of the class described, a bowl loosely supported and rotated from a point above its center of gravity, whereby said bowl is free to assume a position with its geometrical axis at an angle to its gravitational line, and means located entirely at one side of the axis of the bowl and acting directly upon the bowl and independent of its support for positively maintaining the bowl in such position during the rotation thereof.

2. In a separator of the class described, a bowl loosely supported and rotated from a point above its center of gravity, whereby said bowl is free to assume a position with its geometrical axis at an angle to its gravitational line, and a normally non-yieldingly supported roller adapted to contact with said bowl at one side only of the axis thereof to positively maintain it in such position during the rotation thereof.

3. In a separator of the class described, a bowl loosely supported and rotated from a point above its center of gravity, whereby said bowl is free to assume a position with its geometrical axis at an angle to its gravitational line, and a manually adjustable roller adapted to be brought into contact with the bowl at a point below its supporting point to maintain the bowl in such position during the rotation thereof.

4. In a separator of the class described, a spindle, a bowl loosely suspended upon and rotated by said spindle whereby the bowl if unevenly balanced is free to assume a position with its gravitational line substantially coincident with the axis of said spindle and with its geometrical axis at an angle thereto, and means acting directly upon the bowl and independent of the spindle and wholly at one side thereof for positively maintaining the bowl in such position during the rotation thereof.

5. In a separator of the class described, a spindle, a bowl loosely suspended upon and rotated by said spindle, whereby said bowl is free to be moved laterally relative to said spindle, and a roller adapted to be brought into contact with said bowl at one side only thereof to maintain the geometrical axis thereof eccentric to the axis of said spindle to effect smooth running in an unevenly balanced bowl.

6. In a separator of the class described, a spindle, a bowl loosely suspended upon and rotated thereby, whereby the bowl is free to be moved laterally relative to said spindle, a concentric hub located upon the under side of said bowl, and an adjustably mounted roller cooperating with said hub for forcing the geometrical axis of said bowl eccentric to said spindle and maintaining it in such position during the rotation of the bowl.

7. In a separator of the class described, a spindle, a bowl loosely supported upon and rotated thereby, and manually controlled means acting directly upon the bowl and independent of the spindle for positioning said bowl on said spindle with the geometrical axis of the bowl at an angle to the axis of the spindle and for maintaining it in such position during the rotation thereof.

8. In a separator of the class described, a spindle, a bowl provided with a central tube surrounding said spindle and supported thereupon at a point above the center of gravity of said bowl, and means acting directly upon said bowl exteriorly thereof at a point below its supporting point and at one side only of the spindle for maintaining the geometrical axis of the bowl at an angle to the axis of said spindle for effecting smooth running in an unevenly balanced bowl.

9. In a separator of the class described, a spindle, a bowl surrounding said spindle and rotated therefrom, yielding means associated with said spindle and said bowl for positioning the upper end of said bowl substantially concentric with said spindle, and means acting directly upon the bowl and independent of the spindle and at one side only thereof for maintaining the center of gravity of the bowl substantially coincident with the axis of the spindle and the axis of the bowl at an angle thereto to effect smooth running of an unevenly balanced bowl.

10. In a separator of the class described, a spindle, a bowl surrounding said spindle and rotated therefrom, a laterally yielding and expansible sleeve interposed between said spindle and said bowl and supporting the weight of the bowl, and means contacting with said sleeve and actuated by the weight of the bowl to cause the sleeve to expand and to engage the bowl to position the upper end thereof substantially concentric with said spindle, said yielding sleeve and its expanding means being so constructed and arranged as to permit of limited lateral movement of the bowl with respect to the spindle.

11. In a separator of the class described, a spindle, a bowl provided with a central tube loosely surrounding said spindle and rotated therefrom, a yielding sleeve interposed between said spindle and said central tube, said yielding sleeve being provided with a substantially conical seat, a second sleeve fitted within said first mentioned sleeve and cooperating with said seat for expanding said first mentioned sleeve to cause it to grip the inner surface of said central tube and to locate it substantially concentric with said spindle.

12. In a separator of the class described, a spindle, a bowl provided with a central tube loosely surrounding said spindle and rotated therefrom, a yielding sleeve interposed between said spindle and said central tube, said yielding sleeve being provided with a substantially conical seat, a second sleeve fitted within said first mentioned sleeve and provided with a conical head adapted to cooperate with said seat for expanding said first mentioned sleeve to cause it to grip the inner surface of said central tube and to locate it substantially concentric with said spindle, said second sleeve being also provided with a substantially flat upper surface upon which said tube is free to move.

13. In a separator of the class described, a spindle, a bowl provided with a central tube surrounding said spindle and rotated therefrom, the inside diameter of said tube being substantially larger than said spindle, a yielding sleeve surrounding said spindle, a cone adapted to expand said sleeve to cause it to frictionally engage the inner surface of said tube, said cone being provided with a flat bowl-supporting surface upon which the weight of the bowl rests, said yielding sleeve and flat bowl-supporting surface affording means permitting bodily lateral movement of said bowl with respect to said spindle, and means connecting said bowl and spindle for effecting positive rotation of the bowl with the spindle in all of its positions thereon.

14. In a separator of the class described, a spindle, a bowl supported upon and rotated thereby, means connecting said bowl and spindle provided with two flat contacting surfaces substantially concentric with said spindle and permitting angular partial separation of said surfaces whereby their point of contact is entirely at one side of the axis of said spindle, and means for maintaining said surfaces in angular relation during the rotation of the bowl.

15. In a separator of the class described, a bowl, loosely supported and rotated from a point above its center of gravity whereby the bowl is free to assume a position with its geometrical axis at an angle to its gravitational line, and means including a plurality of spaced and manually adjustable rollers supported at one side only of the axis of the bowl cooperating with said bowl to maintain it in such position during the rotation thereof.

In testimony whereof, I have signed my name to this specification.

ERIC G. PEARSON.